(12) United States Patent
Cong et al.

(10) Patent No.: US 11,170,571 B2
(45) Date of Patent: Nov. 9, 2021

(54) OBTAINING HIGH RESOLUTION AND DENSE RECONSTRUCTION OF FACE FROM SPARSE FACIAL MARKERS

(71) Applicant: Lucasfilm Entertainment Company Ltd. LLC, San Francisco, CA (US)

(72) Inventors: Matthew Cong, San Jose, CA (US); Ronald Fedkiw, Sunnyvale, CA (US); Lana Lan, San Francisco, CA (US)

(73) Assignee: LUCASFILM ENTERTAINMENT COMPANY LTD. LLC, San Francisco, CA (US)

( * ) Notice: Subject to any disclaimer, the term of this patent is extended or adjusted under 35 U.S.C. 154(b) by 0 days.

(21) Appl. No.: 16/686,017

(22) Filed: Nov. 15, 2019

(65) Prior Publication Data
US 2021/0150810 A1 May 20, 2021

(51) Int. Cl.
| | |
|---|---|
| *G06T 17/20* | (2006.01) |
| *G06K 9/00* | (2006.01) |
| *G06T 5/50* | (2006.01) |
| *G06T 7/73* | (2017.01) |

(52) U.S. Cl.
CPC ............. *G06T 17/20* (2013.01); *G06K 9/00* (2013.01); *G06T 5/50* (2013.01); *G06T 7/75* (2017.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2008/0152200 | A1* | 6/2008 | Medioni | G06T 7/55 382/118 |
| 2012/0062719 | A1* | 3/2012 | Debevec | H04N 5/2251 348/77 |
| 2015/0142394 | A1* | 5/2015 | Mehr | G06T 7/75 703/1 |
| 2017/0091994 | A1* | 3/2017 | Beeler | G06T 17/20 |
| 2017/0256098 | A1* | 9/2017 | Yumer | G06T 13/40 |

OTHER PUBLICATIONS

Luo et al, '3D Facial Model Synthesis using Voronoi Approach', ISVD'06. (Year: 2006).*
Sugiura et al, '3D surface reconstruction from point-and-line cloud', 2015 Intl. Conf. on 3D Vision, 264:272. (Year: 2015).*
Cong et al., "Local Geometric Indexing of High Resolution Data for Facial Reconstruction from Sparse Markers," Mar. 1, 2019, pp. 1-10.
Cong et al., "Local Geometric Indexing of High Resolution Data for Facial Reconstruction from Sparse Markers," Sep. 4, 2019, pp. 1-10.

* cited by examiner

*Primary Examiner* — Patrick F Valdez (57) ABSTRACT

Some implementations of the disclosure are directed to techniques for facial reconstruction from a sparse set of facial markers. In one implementation, a method comprises: obtaining data comprising a captured facial performance of a subject with a plurality of facial markers; determining a three-dimensional (3D) bundle corresponding to each of the plurality of facial markers of the captured facial performance; using at least the determined 3D bundles to retrieve, from a facial dataset comprising a plurality of facial shapes of the subject, a local geometric shape corresponding to each of the plurality of the facial markers; and merging the retrieved local geometric shapes to create a facial reconstruction of the subject for the captured facial performance.

18 Claims, 8 Drawing Sheets

OBTAINING HIGH RESOLUTION AND DENSE RECONSTRUCTION OF FACE FROM SPARSE FACIAL MARKERS

BRIEF SUMMARY OF THE DISCLOSURE

Implementations of the disclosure describe improved techniques for facial reconstruction from a sparse set of facial markers. In one embodiment, a method comprises: obtaining data comprising a captured facial performance of a subject with a plurality of facial markers; determining a three-dimensional (3D) bundle corresponding to each of the plurality of facial markers of the captured facial performance; using at least the determined 3D bundles to retrieve, from a facial dataset comprising a plurality of facial shapes of the subject, a local geometric shape corresponding to each of the plurality of the facial markers; and merging the retrieved local geometric shapes to create a facial reconstruction of the subject for the captured facial performance.

In some implementations, retrieving the local geometric shape corresponding to each of the plurality of the facial markers, comprises: evaluating a surface position of each of the 3D bundles on each of the plurality of facial shapes in the facial dataset to derive a point cloud corresponding to each of the 3D bundles; creating a tetrahedral mesh from each of the point clouds; and using each of the created tetrahedral meshes to retrieve, from the facial dataset, the local geometric shape corresponding to each of the facial markers.

In some implementations, the created tetrahedral mesh is a non-manifold tetrahedral mesh.

In some implementations, creating the tetrahedral mesh from each of the point clouds, comprises: tetrahedralizing each of the point clouds with a plurality of combinations of four points resulting in a non-manifold tetrahedralized volume. In some implementations, tetrahedralizing each of the point clouds comprises: for at least one of the point clouds, removing points from the point cloud corresponding to expressions not associated with the point cloud, removing tetrahedra, or some combination thereof.

In some implementations, creating the tetrahedral mesh from each of the point clouds, comprises: for at least one of the point clouds, assigning a higher priority to tetrahedra that share more points with a tetrahedron used in a previous video frame for the 3D bundle associated with the at least one point cloud.

In some implementations, creating the tetrahedral mesh from each of the point clouds, comprises: for at least one of the point clouds, selecting a tetrahedron based on a determination that the selected tetrahedron's local surface geometry minimizes distances from neighboring 3D bundles.

In some implementations, merging the retrieved local geometric shapes to create the facial reconstruction of the subject, comprises: joining together the retrieved local geometric shapes to create a unified reconstruction of the subject's face; and blending together the joined shapes of the unified reconstruction.

In some implementations, blending together the joined shapes, comprises: interpolating the joined shapes.

In some implementations, joining together the retrieved local geometric shapes, comprises: constructing a Voronoi diagram from a neutral mesh of the subject's face, the Voronoi diagram comprising a plurality of Voronoi cells; and applying each of the retrieved local geometric shapes to a corresponding one of the cells.

In some implementations, interpolating the joined shapes, comprises: applying natural neighbor interpolation using the Voronoi diagram.

In some implementations, the method further comprises: obtaining the facial dataset, wherein obtaining the facial dataset comprises: acquiring, via an imaging system, a plurality of facial shapes for the subject for a plurality of facial poses of the subject, including a neutral pose of the subject; using a simulatable face model of the subject to target each of the plurality of acquired facial shapes to obtain a plurality of simulated facial shapes; blending together the simulated facial shapes to obtain combined facial shapes; and using at least the combined facial shapes to obtain additional facial shapes corresponding to poses that fall in between two or more of the plurality of facial poses.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

As used herein, the term "3D bundle" or "three-dimensional bundle" refers to a 3D position or point in space that is derived from tracking multiple two-dimensional (2D) positions. For example, in the application of facial animation, a 3D bundle may be derived from using a marker painted on an actor's face in conjunction with two or more cameras that image the actor's face. By tracking the marker in each camera, and using triangulation, a 3D bundle position corresponding to the marker's position may be obtained.

Realistic facial animation has a wide variety of applications in both computer vision and in the entertainment industry. It may be achieved through a combination of keyframe animation, where an animator hand-adjusts controls corresponding to the motion of different parts of the face, and facial performance capture, which uses computer vision to track the motion of an actor's face recorded from one or more cameras. Despite the many techniques developed over the years, facial performance capture remains a difficult task, and the high degree of accuracy required to generate realistic facial animation severely suppresses its widespread impact. For example, although high-resolution facial geometry may be captured using dense performance capture methods, these methods typically require environments with controlled lighting and dedicated camera hardware. These restrictions, along with the limitations on an actor's motion, may make such techniques unsuitable for on-set capture where an actor often needs to interact with the set and/or other actors.

For on-set capture or capture in other settings where dense performance capture methods are not suitable, one class of facial performance capture techniques uses markers painted or otherwise applied on an actor's face in conjunction with a stereo pair of head mounted cameras. These markers are tracked in each camera and triangulated to obtain a sparse set of animated 3D bundle positions representing the motion of the actor's face during a facial performance. A full 3D facial pose may then be reconstructed for each frame of 3D bundles.

One present technique to reconstruct a full 3D facial pose for each frame of 3D bundles interpolates bundle displacements across the face. Given knowledge of what the 3D bundles look like on a subject's neutral rest mesh in the rest pose, 3D bundles can be interpolated across the mesh during movement of the face. However, this often results in a deformed mesh that contains too much of the high-frequency detail of the neutral mesh and too little of the high-frequency detail associated with a particular expression. The human face may have many high resolution details (e.g., wrinkles from smiling) that are not necessarily present in a neutral pose. Because the sparse bundle positions cannot represent high-resolution details between the bundles, especially details that appear during expressions, e.g., folds, furrows, and wrinkles, the reconstructed geometry may be overly smooth. This problem may be referred to an underfitting problem.

Another present technique for reconstructing a full 3D facial pose for each frame of 3D bundles is to use a parameterized (blendshape) model. The markers and/or bundles may be used to drive a blendshape facial rig that specifies the deformation of the face as a linear combination of facial shapes. These facial shapes may be acquired using dense performance capture and/or sculpted by an experienced modeler. Thereafter, one may optimize for the shape weights that minimize the differences between the marker and bundle positions and their associated projected surface positions and surface positions respectively on the resulting mesh. However, these parameterized or blendshape models often have large infeasible spaces including infeasible combinations of shapes with weights that are difficult to interpret. While a skilled animator may aim to avoid these infeasible combinations, an optimization algorithm would need them explicitly specified, which is typically not practical. This problem may be referred to as an overfitting problem.

As such, when considering sparse motion capture marker data, one may struggle to balance its overfitting via a high dimensional blendshape system versus underfitting caused by smoothness constraints. To address these and other deficiencies with prior facial reconstruction techniques, various implementations of the disclosure are directed to improved techniques for facial reconstruction from a sparse set of facial markers. Instead of fitting a blendshape model to the input motion capture marker data or smoothly interpolating a surface displacement to the marker positions, techniques in accordance with the disclosure are directed to using a local geometric indexing scheme to identify, from a high resolution facial shape dataset, the most relevant shapes for each bundle given the bundle position. This may yield local surface geometry for each bundle that may then be combined to obtain a high-resolution facial reconstruction. The high resolution facial dataset, obtained prior to performing local geometric indexing, may be augmented via specially designed physical simulations that target the high resolution dataset such that the simulation output lies on the same so-called manifold as the targeted data.

By virtue of implementing geometric indexing with a high resolution dataset for facial reconstruction, a facial reconstruction having a dense mesh with a high degree of detail may be obtained from a sparse set of input positions obtained from facial markers. This may improve upon the aforementioned shortcomings of prior techniques (e.g., blendshape or interpolation reconstruction), avoiding a result that is overly smooth (underfitting) or one that is overly messy (overfitting). Moreover, by virtue of implementing the techniques of the present disclosure, limited computational resources (e.g., processing resources) may be needed to obtain a highly detailed facial reconstruction from a limited set of inputs.

These and other advantages that may be realized from implementing the systems and methods described may be further appreciated from the disclosure.

Figure 1:
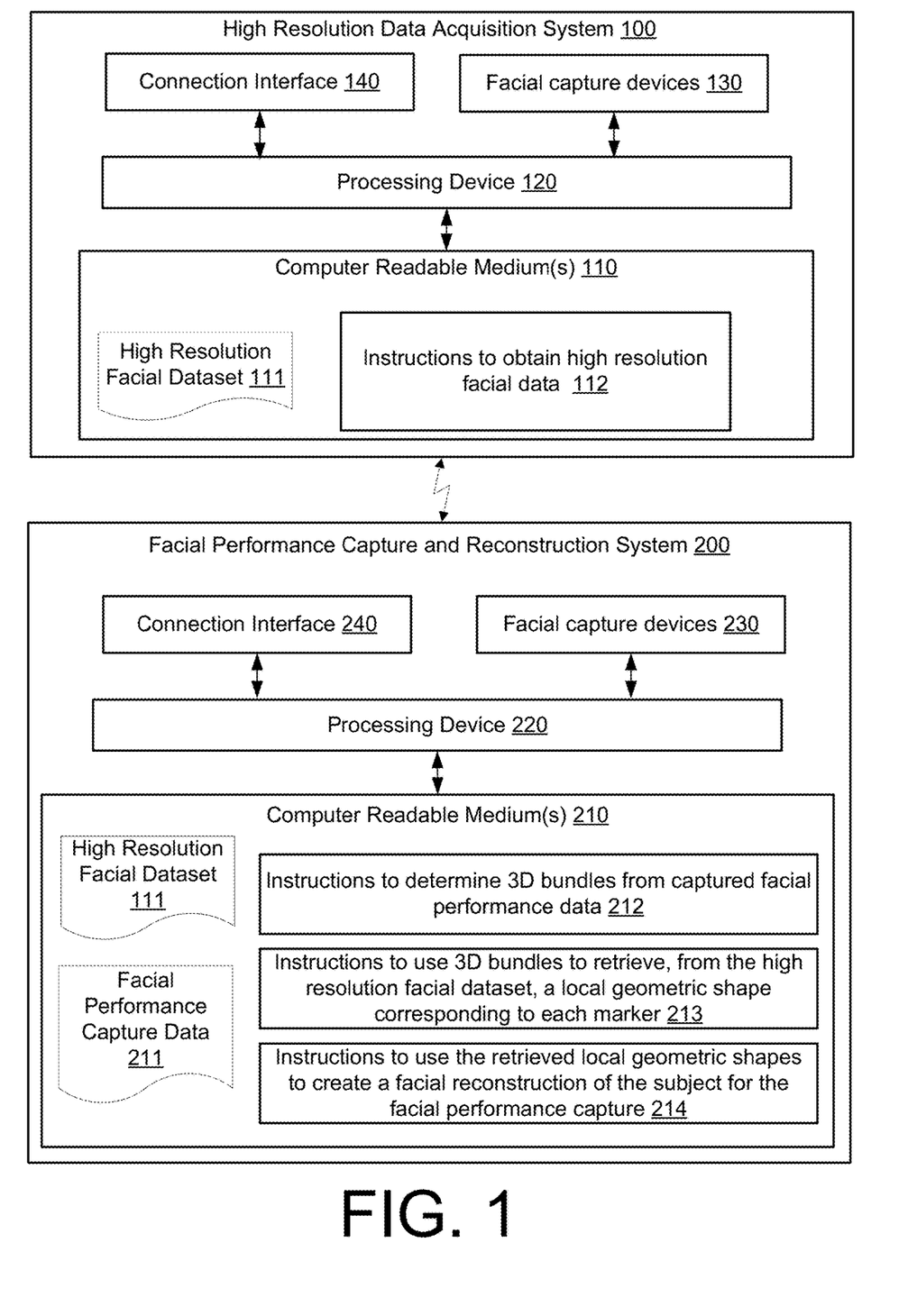
FIG. 1 illustrates an example environment in which the technology described herein may be implemented.

FIG. 1 illustrates an example environment in which the technology described herein may be implemented. FIG. 1 will be described in conjunction with FIG. 2, which is an operational flow diagram illustrating an example method 300 that may be implemented in this environment. As depicted, the environment includes a high resolution data acquisition system 100 and a facial performance capture and reconstruction system 200.

Figure 2:
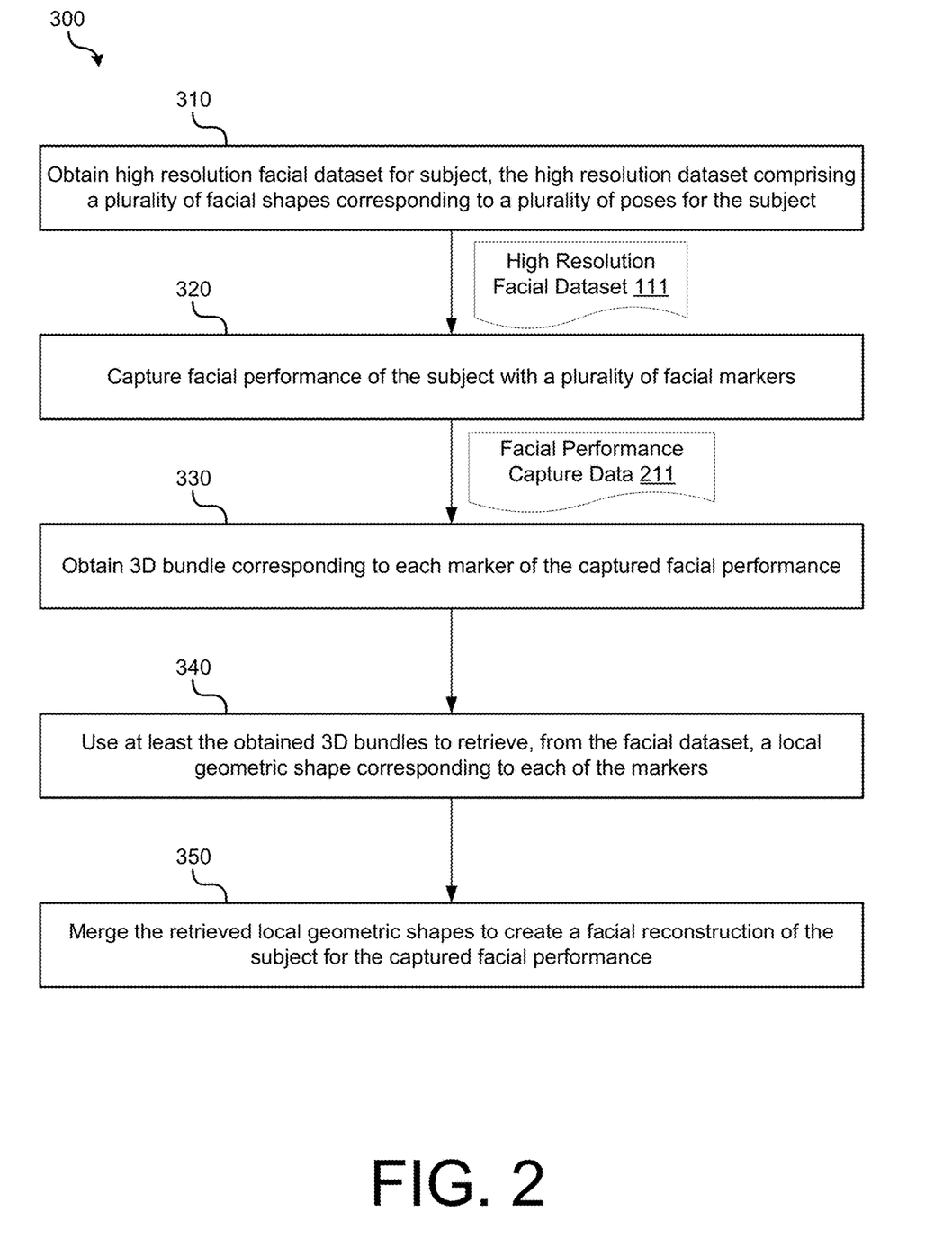
FIG. 2 is an operational flow diagram illustrating an example method that may be implemented in the environment of FIG. 1 in accordance with implementations of the disclosure.

During operation 310, high resolution data acquisition system 100 is configured to obtain a high resolution facial dataset 111 for a subject (e.g., actor), the high resolution dataset comprising a plurality of facial shapes corresponding to a plurality of poses for the subject. Facial shapes of the high resolution dataset may be scanned using a high fidelity system while the subject is a controlled environment. Starting from a high-resolution mesh of the subject in a neutral or rest pose, a dataset of high-quality facial shapes that sufficiently samples the subject's range of motion and expression may be obtained. The facial shapes may be cleaned up using a modeler, and the dataset may be augmented with anatomically accurate simulations. Particular implementations of operation 310 are further described below with reference to FIG. 3.

At operation 320, facial performance capture and reconstruction system 200 is configured to capture a facial performance of the subject with a plurality of facial markers. The captured facial performance may be stored as facial performance capture data 211. The plurality of facial markers may be markers that are painted, adhered, or otherwise placed on the subject's face. For example, the markers may be painted makeup dots. The markers may be distributed on the subject's face in a manner that captures suitable detail of the subject's relevant facial features. The number of markers may vary depending on the implementation. For example, the number of markers may range from 50 to 200 markers. However, it should be appreciated that the techniques of the present disclosure may be implemented in instances where fewer than 50 markers or more than 200 markers are used. During facial performance capture, a set of cameras may each record the subject's facial performance, including the facial markers, for a plurality of video frames. For example, an actor may wear a helmet mounted with cameras in front of the factor to capture stabilized video of the actor's facial performance. The video may be time-synchronized between cameras.

At operation 330, facial performance capture and reconstruction system 200 is configured to obtain (e.g., triangulate) a 3D bundle corresponding to each marker of the facial performance capture. The 3D bundles may be recovered from the recorded camera footage. For example, using triangulation techniques, the 2D footage of each of the cameras may be correlated to obtain 3D positions of each of the markers. Operation 330 may be repeated for each video frame of the facial performance.

At operation 340, facial performance capture and reconstruction system 200 is configured to use at least the obtained 3D bundles to retrieve, from the high resolution facial dataset 111, a local geometric shape corresponding to each of the markers of the captured facial performance. To this end, a local geometric indexing scheme may be utilized wherein relevant associated geometry is identified for each bundle from dataset 111. Particular implementations of operation 340 are further described below with references to FIGS. 4-5. At operation 350, the retrieved local geometric shapes are merged to create a facial reconstruction of the subject for the captured facial performance. Particular implementations of operation 350 are further described below with reference to FIGS. 6-10.

High resolution data acquisition system 100 may include computer readable medium(s) 110, a processing device 120, facial capture devices 130, and connection interface 140. Facial capture devices 130 may be used at operation 310 to obtain a high resolution dataset 111. In some implementations, facial capture devices 130 may be implemented as a rig of one or more cameras and lights with software that may reconstruct a subject's face in full motion, without using motion-capture markers. In other implementations, facial markers may be used.

The computer readable medium(s) 110 may store high resolution dataset 111. Computer readable medium(s) 110 may additionally store instructions 112 that are executable by processing device 120 to obtain high resolution dataset 111. For example, as further described below, the high resolution dataset 111 may be obtained by acquiring high-resolution facial shapes for the subject's neutral pose and extreme poses, using a simulatable face model to obtain simulated facial shapes for the acquired poses, blending together the simulated facial shapes to obtain combined shapes, and obtaining in-between poses.

Connection interface 140 may be to communicatively couple system 100 to a connection interface 240 of facial performance capture and reconstruction system 200. For example, connection interface 140 may be to transmit one or more files including a high resolution dataset 111 for a given subject to system 200. In some implementations, connection interface 140 may be implemented as a wired interface (e.g., an HDMI interface, a USB interface such as a USB Type-C interface, a THUNDERBOLT interface, an Ethernet interface, etc.). In some implementations, connection interface 140 may be implemented as a wireless interface (e.g., a WiFi communications interface, a cellular communications interface, a satellite communications interface, etc.). In some implementations, connection interface 140 may comprise a combination of both wired and wireless interfaces.

Facial performance capture and reconstruction system 200 may include computer readable medium(s) 210, a processing device 210, facial capture devices 230, and connection interface 240. Facial capture devices 230 may be used at operation 320 to capture video of a subject during a facial performance. For example, facial capture devices 230 may include one or more cameras, lights, helmets, etc. Capture may occur during facial performance capture for media content creation.

The computer readable medium(s) 210 may store data including high resolution facial dataset 111 and facial performance capture data 211 captured using facial capture devices 230. Computer readable medium(s) 210 may store instructions that are executable by processing device 220 to performance methods in accordance with the disclosure. For example, medium(s) 210 may store instructions 212, that are executable by processing device 220 to determine 3D bundles from captured facial performance data 211. Additionally, medium(s) 210 may store instructions 213 that are executable by processing device 220 to use the determined 3D bundles to retrieve, from the high resolution facial dataset 111, a local geometric shape corresponding to each marker. Further, medium(s) 210 may store instructions 214, that are executable by processing device 220, to use the retrieved local geometric shapes to create a facial reconstruction of the subject for the facial performance capture.

Connection interface 240 may be to communicatively couple facial performance capture and reconstruction system 200 to high resolution data acquisition system 100. For example, connection interface 240 may be to receive one or more files including high resolution dataset 111 from system 100.

Although the foregoing examples depict systems 100 and 200 as separate systems performing respective operations of method 300, it should be appreciated that in other implementations all of the operations of method 300 may be performed by the same system. Alternatively, additional systems may be employed to perform the operations of method 300. For example, operations 320 and 330-350 (or operations 320-330 and 340-350) may be performed via separate systems.

Figure 3:
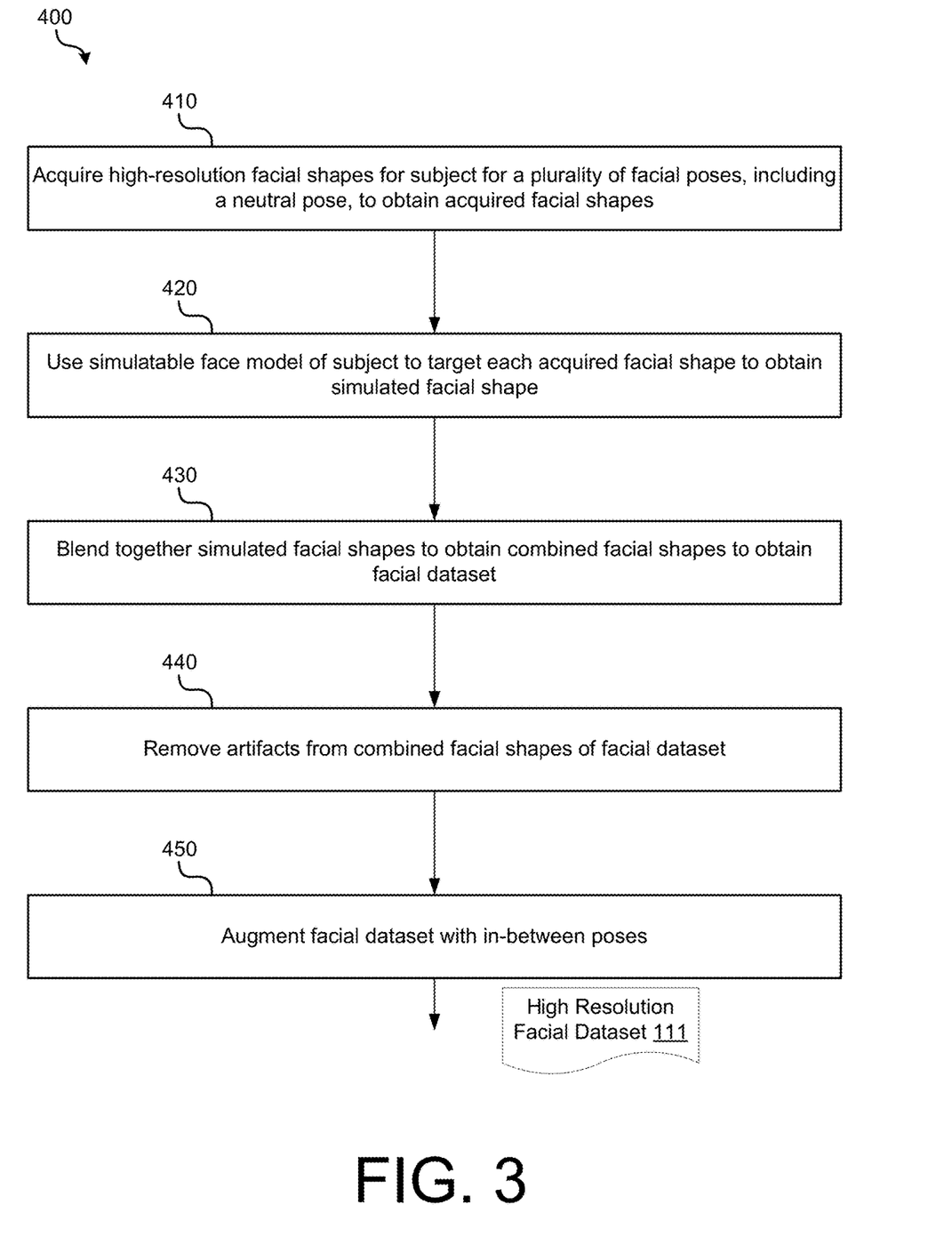
FIG. 3 is an operational flow diagram illustrating one particular method for obtaining a high resolution facial dataset, in accordance with implementations of the disclosure.

With particular reference now to obtaining high resolution facial dataset 111 (e.g., operation 310), given a high-resolution mesh of a subject in the neutral or rest pose, a dataset of high-quality facial shapes may be constructed that sufficiently samples the actor's range of motion and expression. To this end, FIG. 3 is an operational flow diagram illustrating one particular method 400 for obtaining this facial dataset. For example, method 400 may be implemented using a processing device 120 executing instructions 112. In some implementations, the high resolution facial dataset 111 may be obtained as part of a one-time database creation step for the particular subject. In this manner, any system (e.g., system 200) may use the dataset with any subsequent facial performance capture of the subject to obtain a high quality facial reconstruction of the subject from a sparse set of inputs (e.g., facial markers). In some implementations, the high resolution facial dataset 111 may be updated to account for changes in the subject's facial appearance (e.g., due to aging, weight changes, etc.).

At operation 410, high-resolution facial shapes are acquired for the subject for a plurality of facial poses, including a neutral pose. The facial shapes may be acquired for the subject for a selection of the subject's extreme facial poses taken from a range of motion exercise using a facial performance capture system. The facial performance capture system may use facial capture devices 130 including a rig of one or more cameras and lights with software that reconstructs the subject's face in full motion, without using motion-capture dots. For each facial pose, the facial performance capture system may deform the neutral mesh to the pose based on images from multiple cameras, and may estimate the cranium rigid frame associated with the deformed mesh. The cranium rigid frame may be manually refined as needed and validated against the images from each of the cameras. The cranium rigid frame may then be used to stabilize the associated deformed mesh. Each stabilized deformed mesh may be stored as a per-vertex displacement from the neutral mesh.

At operation 420, a simulatable face model of the subject is used to obtain simulated facial shapes from the acquired facial shapes (e.g., stabilized facial shapes). Starting from the high-resolution neutral mesh, a simulatable anatomical face model may be built by morphing an anatomically and biomechanically accurate template model. Then, using an art-directed muscle simulation framework, each captured facial shape may be targeted to obtain a corresponding simulated facial shape. The corresponding simulated facial shape may exhibit improved volume conservation, more realistic stretching, and/or a more plausible response to contact and collision.

At operation 430, the simulated facial shapes are blended together to obtain combined facial shapes. The simulated facial shapes may be selectively blended together by a modeler to obtain a combined facial shape that incorporates both the high degree of detail obtained from capture as well as the physical accuracy obtained from simulation.

At operation 440, artifacts are removed from the combined facial shapes. A modeler may use the simulation software used at operation 430 to manually refine the combined facial shapes based on the images in order to resolve any remaining artifacts before being added them to the facial dataset. In some instances, operation 440 may be skipped.

Following operation 440, the dataset may comprise high resolution facial shapes corresponding to various extreme poses. At operation 450, the facial dataset is augmented with in-between poses. By augmenting the dataset with in-between poses, subtle motions and combinations of expressions may be better represented. In some implementations, in-between poses may be obtained using an art-directed muscle simulation framework. Any suitable technique may be used to obtain in-between poses. In some implementations, in-between poses may be obtained by using the muscle simulation framework as discussed. In some implementations, in-between poses may be directly captured (e.g., by following operations 410-440, discussed above). In other implementations, a blendshape system may be constructed using the facial shapes already in the dataset, and this blendshape system may be evaluated at fixed intervals in the high-dimensional Cartesian space to obtain in-between poses.

Although the above describes an example method for obtain a high resolution facial dataset 111, it should be appreciated that any suitable set of techniques may be used to capture a high resolution facial dataset comprising a plurality of facial shapes for a plurality of expressions of a subject.

Figure 4:
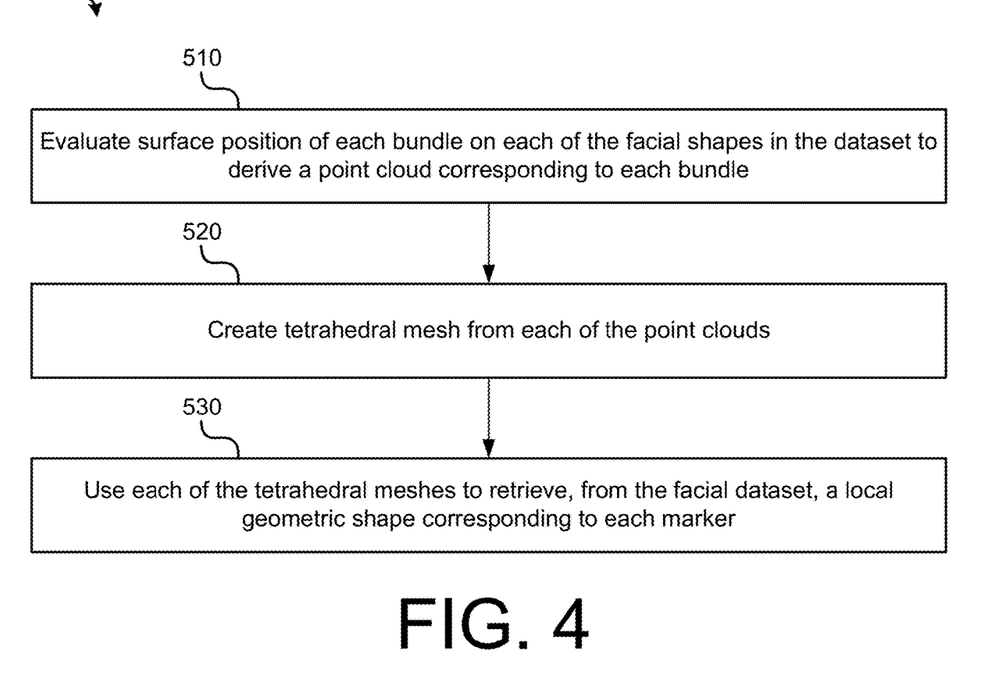
FIG. 4 is an operational flow diagram illustrating an example method of retrieving local geometric shapes corresponding to each motion capture marker of a captured facial performance, in accordance with implementations of the disclosure.

FIG. 4 is an operational flow diagram illustrating an example method 500 of retrieving local geometric shapes corresponding to each motion capture marker of a captured facial performance, in accordance with implementations of the disclosure. Method 500 may correspond to operation 340, which is performed after a high resolution facial dataset 111 and 3D bundles corresponding to each marker of facial performance capture data 211 are obtained. The technique of method 500, further described below, may be thought of as local geometric indexing wherein for each bundle relevant associated geometry needs to be identified from the dataset 111.

At operation 510, a surface position (i.e., 3D position) of each bundle is evaluated on each of the facial shapes in the dataset 111 to derive a point cloud corresponding to each bundle. These point clouds may then be used to index the dataset in order to determine the most relevant shapes given a bundle position. As further discussed below, a bundle position that lies outside of its associated point cloud may indicate a lack of data and can be projected back towards the point cloud. On the other hand, it is also possible for many candidate points to exist in the point cloud in which case neighboring bundles and their associated point clouds may be used to disambiguate.

At operation 520, a tetrahedral mesh is created from each of the point clouds. This operation may be referred to as tetrahedralization. In some implementations, each point cloud may be tetrahedralized with all possible combinations of four points resulting in a non-manifold tetrahedralized volume. This approach of tetrahedralizing each point cloud with all possible combinations may be referred to as a brute force approach.

In other implementations, this brute force approach may be avoided. As the size of the point cloud increases, the construction of all possible tetrahedra may become unwieldy. To remedy this problem, redundancies may be removed from the point cloud, e.g., by removing points corresponding to expressions that do not involve them. For example, bundle evaluations may not be added to a forehead bundle's point cloud from expressions that only involve the lower half of the face. In addition to, or as an alternative to, reducing the number of points, tetrahedra may be eliminated. For example, poorly shaped tetrahedra, e.g., too thin, too much spatial extent, etc., may be removed. As another example, tetrahedra that are known to be problematic admitting shapes that are locally off-model may be deleted. As a further example, unused or rarely used tetrahedra may be removed. In implementations, through continued use and statistical analysis, a tetrahedral database may evolve for increased efficiency and quality.

In alternative implementations, instead of considering all possible combinations of four points, each point cloud may be tetrahedralized using a space-filling tetrahedralization algorithm such as constrained Delaunay tetrahedralization. However, this approach may restrict a bundle position to lie uniquely within a single tetrahedron and create a bijection between a bundle position and local surface geometry. This may be problematic because different expressions may map to the same bundle position with different local curvature. For example, a bundle along the midline of the face on the red lip margin may have the same position during both a smile and a frown.

Thus, in some implementations, it may be preferable to construct an overlapping non-manifold tetrahedralization in order to allow for multiple candidate local surface geometries for a bundle position, later disambiguating using additional criteria. Moreover, as further discussed below, more than one point cloud may be created for an associated bundle with each point cloud corresponding to different criteria. For example, the shapes one uses for an open jaw could differ significantly when comparing a yawn and an angry yell; different point clouds for sleepy, angry, happy, etc., may help to differentiate in such scenarios.

Figure 5:
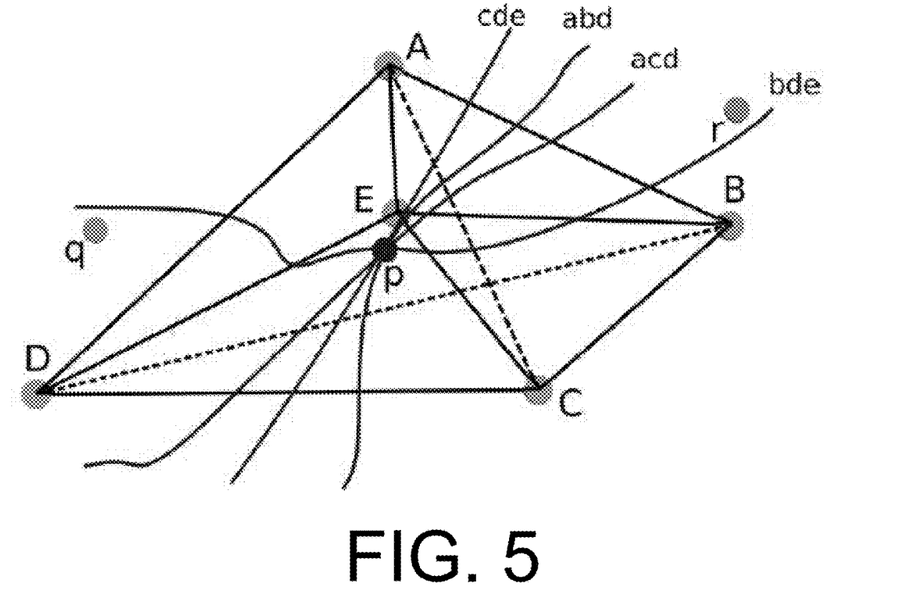
FIG. 5 illustrates how an overlapping non-manifold tetrahedralization may remove uniqueness in $\mathbb{R}^3$ and boost the domain to a higher dimensional space, in accordance with implementations of the disclosure.

FIG. 5 illustrates how an overlapping non-manifold tetrahedralization may remove uniqueness in $\mathbb{R}^3$ and boost the domain to a higher dimensional space. In the nonoverlapping manifold triangulation of vertices A, B, C, D, and E formed by the solid black lines, interior bundle $p \in \mathbb{R}^2$ is located in exactly one triangle CDE and therefore has a unique candidate shape shown by blue line cde. In the overlapping non-manifold triangulation obtained by adding the dashed black lines between AC and DB, p is now located in triangles CDE, BDE, ABD, and ACD and has multiple candidate shapes shown by the blue lines cde, bde, abd, and acd respectively. Thus, the uniqueness of the candidate shape with respect to has been removed. In order to disambiguate among the candidate shapes and minimize kinks in the reconstruction, triangle BDE is chosen, which yields local surface geometry bde minimizing the distance to neighboring bundles q and $r \in \mathbb{R}^2$. Consequently, the triangle associated with p depends on p, q, and r, which boosts the domain from $\mathbb{R}^2$ to $\mathbb{R}^6$. The nonoverlapping triangulation resulting in cde would have yielded the most discontinuous reconstruction. The generalization to tetrahedra in $\mathbb{R}^3$ is straightforward.

At operation 530, the tetrahedral meshes are used to retrieve, using the facial dataset 111, a local geometric shape corresponding to each of the markers associated with the given bundles. Given a bundle position and an associated tetrahedralized volume that contains it, all the tetrahedra in the volume may be found. Because the tetrahedralized volumes are only dependent on the dataset, this may be accelerated by precomputing a uniform grid spatial acceleration structure. For each of these tetrahedra, the convex barycentric weights $(w_i, w_j, w_k, w_l)$ of the bundle position may be computed and used to blend together the four facial shapes $\vec{b}_i, \vec{b}_j, \vec{b}_k,$ and $\vec{b}_l$ corresponding to the vertices of the tetrahedron. The resulting candidate shape may be given by Equation (1):

$$\vec{x} = \vec{x}_0 + \Sigma_{n \in \{i,j,k,l\}} w_n \vec{b}_n \qquad (1)$$

where $\vec{x}_0$ represents the neutral mesh positions. By construction, the candidate surface geometry is guaranteed to intersect the bundle position and lie within the convex hull of the facial shapes.

In implementations where there are no tetrahedra that contain the bundle position, the bundle position may be projected to the convex hull of the associated point cloud by using the barycentric coordinates for the closest point on the associated tetrahedralized volume.

Figure 6:
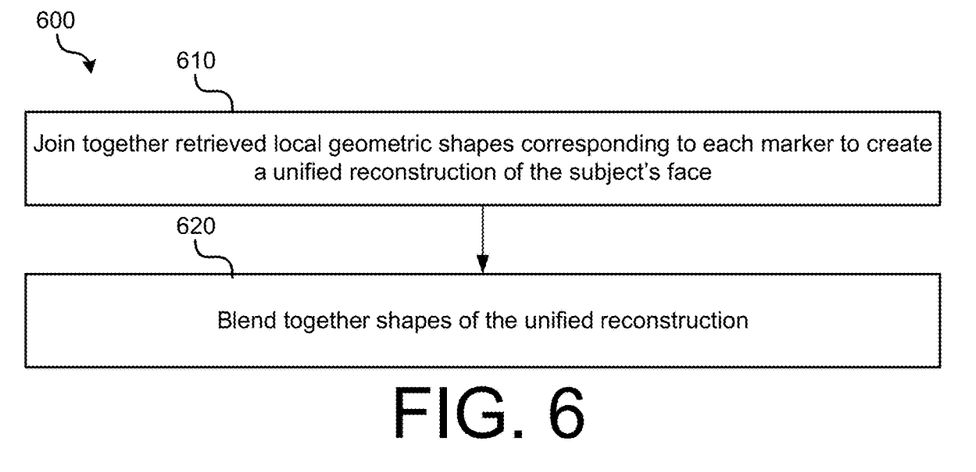
FIG. 6 is an operational flow diagram illustrating an example method of merging retrieved local geometric shapes corresponding to each bundle to create a facial reconstruction, in accordance with implementations of the disclosure.

FIG. 6 is an operational flow diagram illustrating an example method 600 of merging retrieved local geometric shapes corresponding to each bundle to create a facial reconstruction, in accordance with implementations of the disclosure. For example, method 600 may correspond to operation 350.

At operation 610, the retrieved local geometric shapes corresponding to each marker may be joined together to create a unified reconstruction of the subject's face. As discussed above, the local geometric indexing scheme may generate local surface geometry for each bundle independently. This local surface geometry may subsequently be sewn or patched together to create a unified reconstruction of the full face. Because only local geometry may be required, only small surface patches may be stored (and not the full face geometry) for each point in the point cloud. This may make the method more scalable.

Figure 7:
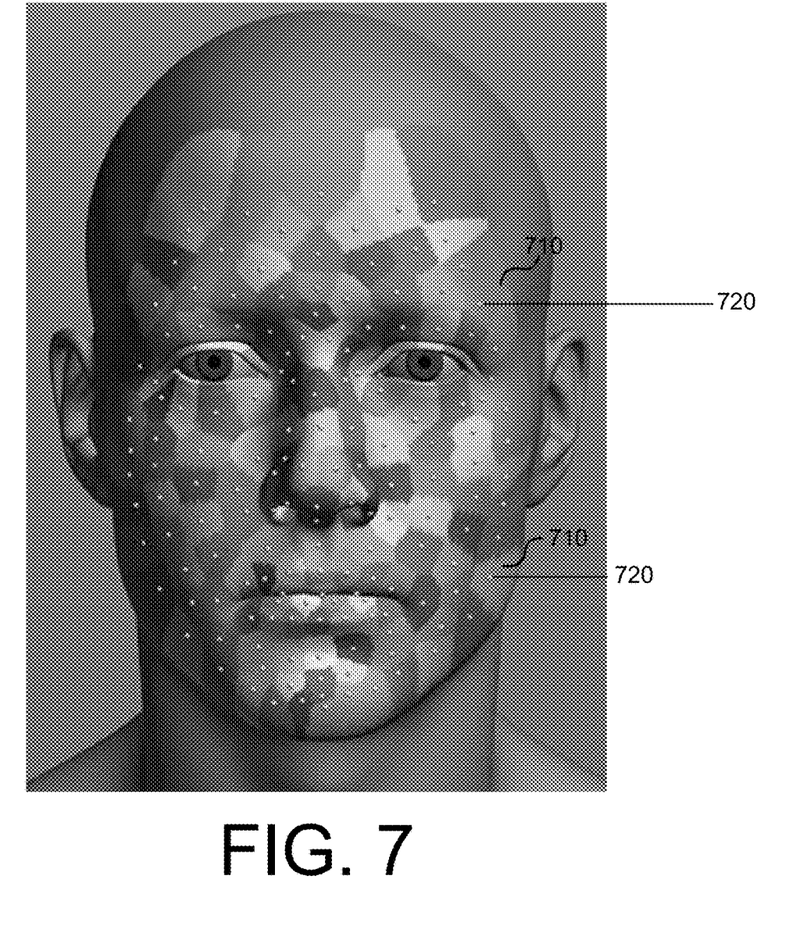
FIG. 7 depicts an example of a Voronoi diagram on a neutral mesh, the Voronoi diagram including cells associated with markers having corresponding bundle positions, in accordance with implementations of the disclosure.

In some implementations, to join the local patches together, a Voronoi diagram may be constructed from the neutral mesh using the geodesic distances to the surface position of each bundle in the rest pose. These geodesic distances may be computed using the fast marching method. FIG. 7 depicts one such example of a Voronoi diagram on a neutral mesh, the Voronoi diagram including cells 710 associated with markers 720 having corresponding bundle positions.

Figure 8:
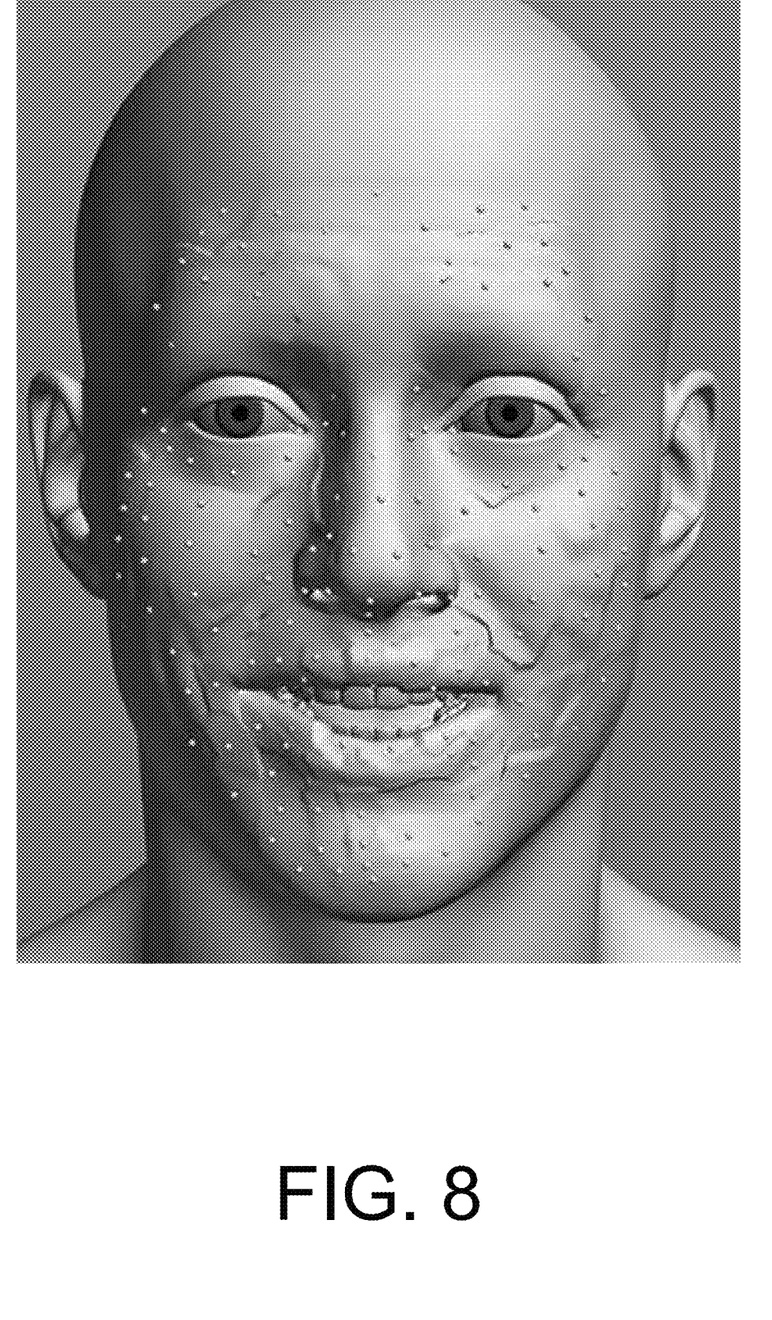
FIG. 8 depicts the results of applying the locally indexed surface geometry to each Voronoi cell of FIG. 7, in accordance with implementations of the disclosure.

After a Voronoi diagram is constructed, the local surface geometry for each bundle may then be applied to its associated Voronoi cell on the mesh. FIG. 8 depicts the results of applying the locally indexed surface geometry to each Voronoi cell. As depicted, the resulting face shape typically has discontinuities across Voronoi cell boundaries.

At operation 620, the shapes of the unified reconstruction are blended together. This may remove discontinuities in the resultant face shape. In implementations, the shapes may be blended together using interpolation. A number of scattered interpolation methods aimed at smoothing the local patches across Voronoi cell faces may be utilized.

In particular implementations, natural neighbor interpolation may be applied using a Voronoi diagram. For a given vertex on the neutral mesh, natural neighbor weights may be computed by inserting the vertex into the precomputed Voronoi diagram, computing the areas stolen by the new vertex's Voronoi cell from each of the pre-existing neighboring Voronoi cells, and normalizing by the total stolen area. For each vertex, the natural neighbor weights may be used to linearly blend the shapes used for each surrounding bundle. A vertex placed at a bundle position would not change the Voronoi regions of surrounding bundles and would merely adopt the Voronoi region from the bundle it is coincident with, which may ensure that the resulting blended surface exactly interpolates the bundle positions. In this manner, a $C^0$ continuous reconstructed surface that passes through all of the bundle positions may be obtained.

Figure 9:
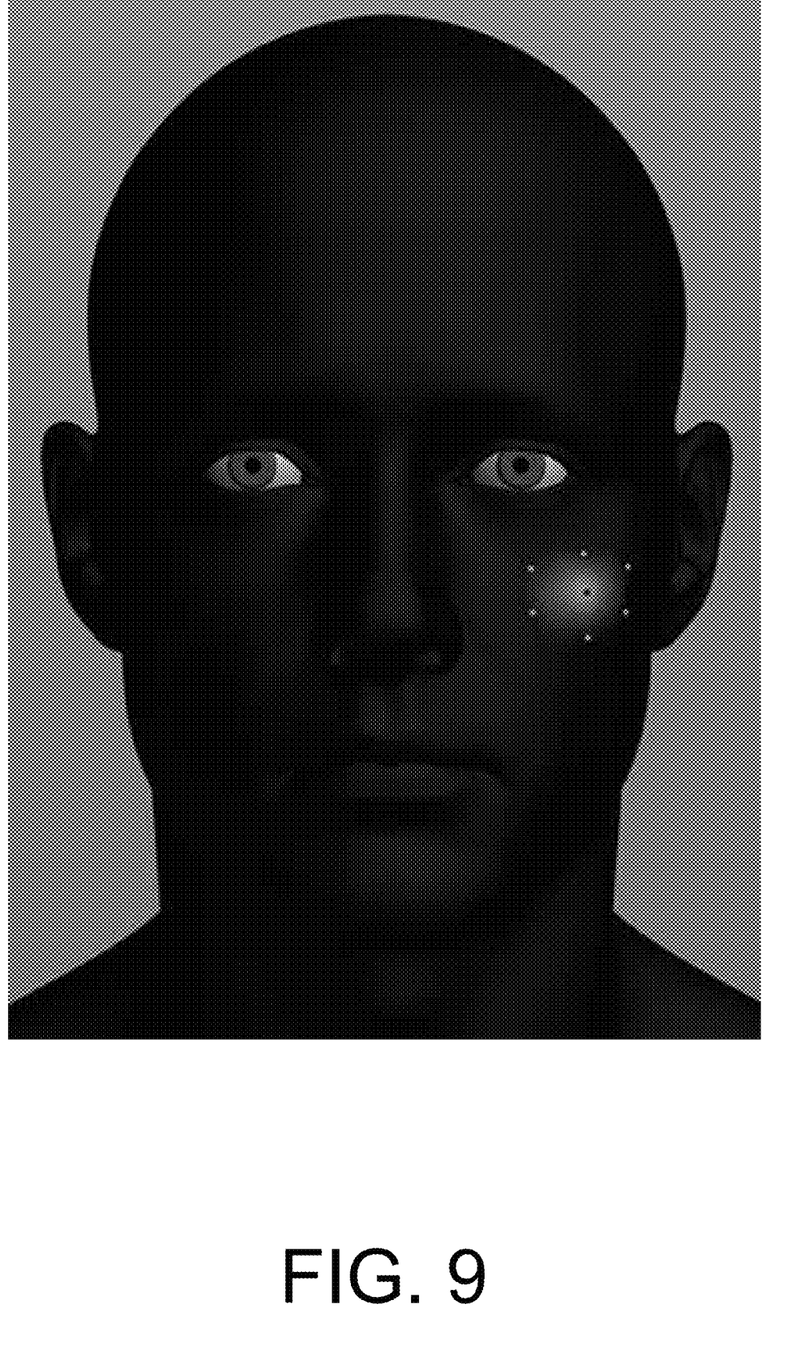
FIG. 9 depicts the application of natural neighbor weights for a single bundle, in accordance with implementations of the disclosure.

FIG. 9 depicts natural neighbor weights for a single bundle. The weight is 1 at the bundle surface position and 0 at the surface positions corresponding to neighboring bundles.

Figure 10:
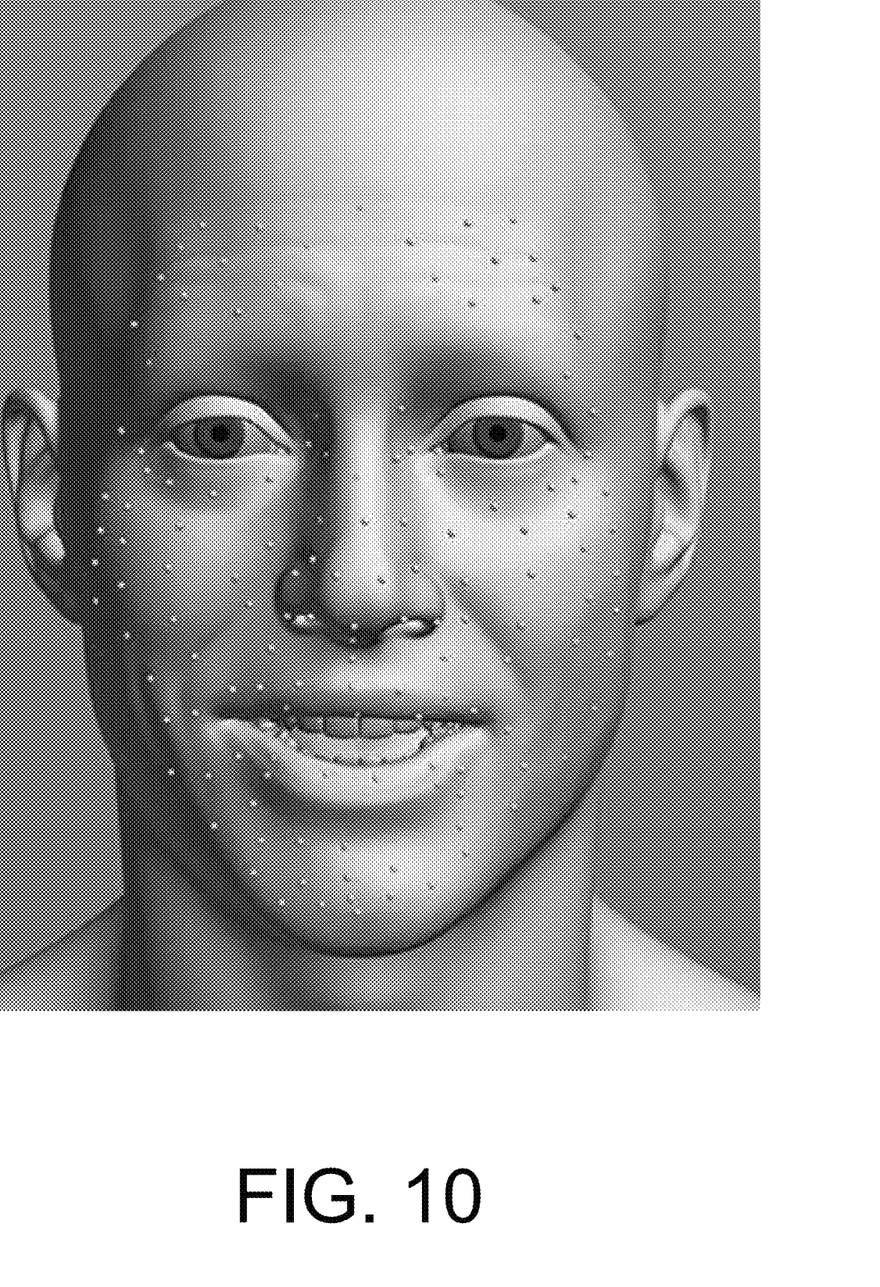
FIG. 10 depicts the results of applying natural neighbor weights to all bundles of a Voronoi diagram, in accordance with implementations of the disclosure.

FIG. 10 depicts the results of applying natural neighbor weights to all bundles. As illustrated, when contrasted to FIG. 8, which has no blending applied, the result is a smoother reconstruction that interpolates the bundle positions. Constructing the Voronoi diagram and calculating the natural neighbor weights in UV/texture space and subsequently mapping them back onto the 3D mesh may yield smoother natural neighbor weights than performing the equivalent operations on the 3D mesh directly.

In alternative implementations, instead of using natural neighbor interpolation, radial basis functions (RBF) may be used to smooth with the aforementioned local geometric indexing algorithm. The RBF may be applied on the facial shape weights as opposed to the vertex positions themselves, yielding high-resolution features from the dataset in the reconstruction. However, the reconstructed surface may not pass through the bundles. This may be corrected by smoothly interpolating the remaining displacements needed to properly interpolate the bundles across the mesh.

In some implementations, in order to minimize kinks in the $C^0$ continuous reconstructed surface, an additional smoothness criterion may be used when choosing between overlapping tetrahedra. If there are multiple tetrahedra that contain the bundle position, the tetrahedron that is chosen is the one that results in local surface geometry that minimizes the distances from neighboring bundle positions to their respective surface positions. This indicates that the local surface geometry is representative of the bundle as well as the neighborhood between the bundle and its neighboring bundles. In the case where no tetrahedra contain the bundle position, a similar criterion may be applied to project the bundle back to the dataset in a smooth manner. When deciding which tetrahedron to project to, in addition to considering the distance from the bundle under consideration to the resulting surface, the distances that neighboring bundles would be from the resulting surface may be considered.

In implementations involving animated bundles having time-varying positions (e.g., over multiple video frames), additional smoothness criteria may be applied to prevent disjointed sets of shapes from being chosen in neighboring frames. By virtue of this approach, undesirable oscillations may be ameliorated in the animated reconstructed surface. To this end, a higher priority may be assigned to tetrahedra that share more points and therefore facial shapes with the tetrahedron used on the previous frame. This may bias towards a continuous so-called winding number on the non-manifold representation.

In some implementations, displacements of facial shapes and bundle positions due to rotational and/or prismatic jaw motion may be taken into account when selecting shapes for facial reconstruction. To account for the jaw pose, linear blend skinning may be applied. To this end, Equation (1) may be modified with a block diagonal matrix of spatially varying invertible transformations $T(\theta)$ calculated using linear blend skinning from the jaw parameters $\theta$ and a set of unskinned facial shapes $\vec{b}_n{}^*$ to obtain Equation (2):

$$\vec{x} = T(\theta)(\vec{x}_0 + \Sigma_{n \in \{i,j,k,l\}} w_n \vec{b}_n{}^*) \qquad (2)$$

For a shape with known jaw parameters $\theta_n$, setting Equation (1) equal to Equation (2) and rearranging terms gives an expression for the unskinned facial shape Equation (3):

$$\vec{b}_n = T(\theta_n)^{-1}(\vec{x}_0 + \vec{b}_n) - \vec{x}_0 \qquad (3)$$

as a function of the facial shape $\vec{b}_n$. To utilize this approach, every shape in the database may have the jaw parameters $\theta_n$ estimated store $\vec{b}_n{}^*$ instead of $\vec{b}_n$. Similarly for each frame, $\theta$ is be estimated using one of the usual methods for head and jaw tracking so that the bundle positions may be unskinned before indexing into the point cloud. As discussed above, having a large number of points may result in an unwieldy number of tetrahedra. Accordingly, points may be binned into different point clouds based on a partition computed using the jaw parameters $\theta$, and each point cloud would only contain a range of jaw parameters and would therefore be smaller.

Experimental Results

In order to verify techniques in accordance with the disclosure, a set of 3D bundles was calculated for each facial shape in a facial shape dataset or library by evaluating the surface position of each bundle on the facial shape. Then, each set of bundle positions was inputted into a local geometric indexing algorithm. Visually, the resulting reconstructions were nearly identical to the original facial shapes. For example, such results were obtained in one experiment by directly scanning the face of a subject for five different expressions and comparing those scans to the facial shapes obtained form local geometric indexing techniques in accordance with the disclosure.

Techniques in accordance with the disclosure were also evaluated on a high-resolution performance outputted from the Medusa performance capture system. The jaw of the subject was tracked using the lower teeth during the portions of the performance where they are visible and interpolated to the rest of the performance using the chin bundles as a guide. As in the previous experiment, a set of 3D bundles was calculated for each frame of the performance. This animated set of 3D bundles was used as input into the aforementioned local geometric indexing algorithm. For example, such results were obtained in one experiment by comparing expressions for a high-resolution facial performance processed using the Medusa performance capture system with reconstruction obtained using local geometric indexing driven by the bundle positions on the captured geometry. It was observed that the resulting high-resolution reconstruction of the performance using the facial shape dataset was very similar to the original performance. Visible differences in the mouth corners and lips were due to artifacts in the Medusa performance capture. By indexing the most relevant cleaned up shapes in the dataset, a cleaner reconstruction was obtained while also adding detail sculpted by a modeler such as lip wrinkles.

Techniques in accordance with the disclosure were also compared to conventional approaches for facial reconstruction from facial markers. In one experiment, comparison results were obtained on a performance captured using two vertically stacked helmet mounted fisheye cameras. The images from both cameras was undistorted and the cameras were calibrated using the markers on the helmet. The calibrated cameras were used to triangulate bundle positions which were then rigidly aligned to the neutral mesh using a combination of the bundles on the nose bridge, forehead, and the cheeks with varying weights based on the amount of non-rigid motion in those regions. The jaw was tracked in the same manner as the previous experiment. In this experiment, interpolating the bundle displacements across the mesh in accordance with conventional techniques reconstructed a yawn instead of the angry face in the corresponding helmet mounted camera footage because it did not contain any additional high-resolution detail beyond that of the neutral mesh. Because the neutral mesh represents one's face while expressionless, similar to that when asleep, using the displacements of the neutral mesh and its features often leads to expressions that appear tired. In the same experiment, a blendshape rig was constructed using the facial shapes in a high resolution facial dataset. Then, a solution was found for the blendshape weights that minimized the Euclidean distances from the bundles to their relevant surface points subject to a soft constraint that penalizes the weights to lie between 0 and 1. The result incorporated more high-resolution details than the previous approach, but suffered from overfitting resulting in severe artifacts around the mouth and eyes, which is the typical overfitting symptomatic of blendshape rigs. Even though the resulting weights were between 0 and 1, they were neither convex nor sparse which led to unnatural combinations. In the same experiment, a facial reconstruction approach utilized Gaussian RBF interpolation in accordance with the present disclosure. This approach results in additional high-resolution detail and a continuous reconstruction, but it may cause neighboring bundles to bleed influence into each other. Also in the same experimental, a facial reconstruction approach utilized natural neighbor interpolation in accordance with the present disclosure. It was observed that this approach captured many of the high-resolution details that are not present in the neutral mesh, including the deepened nasolabial folds, jowl wrinkles, and lip stretching without the overfitting artifacts observed from the reconstruction obtained using the conventional approach.

In one experiment, the ability of techniques of the present disclosure to capture subtle expressions while also maintaining temporal coherency in the presence of bundle positions with random and systematic errors (e.g. errors in depth due to the limited parallax between the two cameras) was demonstrated. In this experiment, helmet mounted camera footage of a subject was captured. A facial reconstruction of the subject was obtained using techniques in accordance with the present disclosure to capture a subtle expression in the helmet mounted camera footage. A facial reconstruction was also obtained using added simulated in-betweens in accordance with the disclosure, which improved the smoothness of the reconstruction in the philtrum and the right jowl while also improving the lift in the upper right cheek. A heatmap highlighting difference, before and adding the simulated in-betweens, illustrated the efficacy of augmenting the dataset using an art-directed muscle simulation framework as described herein. In this experiment, temporal smoothness was applied by taking a central moving average of the barycentric weights associated with each bundle relative to the jaw skinned neutral mesh in order to avoid smoothing the jaw animation. Because transitions between different sets of shapes may typically occur when the same bundle position is achievable using multiple tetrahedra, this temporal smoothing scheme had negligible impact on the ability for the reconstruction to interpolate the bundles.

In some implementations, the local geometric indexing techniques described herein may be used to generate actor-specific facial rigs. Given a generic template blendshape rig applied to the actor neutral mesh, bundle positions for individual blendshapes may be evaluated and used as input into a local geometric indexing algorithm to reconstruct corresponding actor-specific blendshapes. The same approach may be applied to combinations of blendshapes in order to obtain corresponding actor-specific corrective shapes that do not exhibit the artifacts commonly found in combinations of blendshapes. These actor-specific blendshapes and corrective shapes may be incorporated into an actor-specific nonlinear blendshape facial rig for use in keyframe animation and other facial capture applications.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
obtaining data comprising a captured facial performance of a subject with a plurality of facial markers;
determining a three-dimensional (3D) bundle corresponding to each of the plurality of facial markers of the captured facial performance;
using at least the determined 3D bundles to retrieve, from a facial dataset comprising a plurality of facial shapes of the subject, a local geometric shape corresponding to each of the plurality of the facial markers; and
merging the retrieved local geometric shapes to create a facial reconstruction of the subject for the captured facial performance;
wherein retrieving the local geometric shape corresponding to each of the plurality of the facial markers, comprises:
evaluating a surface position of each of the 3D bundles on each of the plurality of facial shapes in the facial dataset to derive a point cloud corresponding to each of the 3D bundles;
creating a tetrahedral mesh from each of the point clouds; and
using each of the created tetrahedral meshes to retrieve, from the facial dataset, the local geometric shape corresponding to each of the facial markers.

2. The method of claim 1, wherein the created tetrahedral mesh is a non-manifold tetrahedral mesh.

3. The method of claim 1, wherein creating the tetrahedral mesh from each of the point clouds, comprises: tetrahedralizing each of the point clouds with a plurality of combinations of four points resulting in a non-manifold tetrahedralized volume.

4. The method of claim 3, wherein tetrahedralizing each of the point clouds comprises: for at least one of the point clouds, removing points from the point cloud corresponding to expressions not associated with the point cloud, removing tetrahedra, or some combination thereof.

5. The method of claim 1, wherein creating the tetrahedral mesh from each of the point clouds, comprises: for at least one of the point clouds, assigning a higher priority to tetrahedra that share more points with a tetrahedron used in a previous video frame for the 3D bundle associated with the at least one point cloud.

6. The method of claim 1, wherein creating the tetrahedral mesh from each of the point clouds, comprises: for at least one of the point clouds, selecting a tetrahedron based on a determination that the selected tetrahedron's local surface geometry minimizes distances from neighboring 3D bundles.

7. The method of claim 1, wherein merging the retrieved local geometric shapes to create the facial reconstruction of the subject, comprises:
joining together the retrieved local geometric shapes to create a unified reconstruction of the subject's face; and
blending together the joined shapes of the unified reconstruction.

8. The method of claim 7, wherein blending together the joined shapes, comprises: interpolating the joined shapes.

9. The method of claim 8, wherein joining together the retrieved local geometric shapes, comprises:
constructing a Voronoi diagram from a neutral mesh of the subject's face, the Voronoi diagram comprising a plurality of Voronoi cells; and
applying each of the retrieved local geometric shapes to a corresponding one of the cells.

10. The method of claim 9, wherein interpolating the joined shapes, comprises: applying natural neighbor interpolation using the Voronoi diagram.

11. The method of claim 1, further comprising: obtaining the facial dataset, wherein obtaining the facial dataset comprises:
acquiring, via an imaging system, a plurality of facial shapes for the subject for a plurality of facial poses of the subject, including a neutral pose of the subject;
using a simulatable face model of the subject to target each of the plurality of acquired facial shapes to obtain a plurality of simulated facial shapes;
blending together the simulated facial shapes to obtain combined facial shapes; and
using at least the combined facial shapes to obtain additional facial shapes corresponding to poses that fall in between two or more of the plurality of facial poses.

12. A non-transitory computer-readable medium having executable instructions stored thereon that, when executed by a processor, performs a method comprising:
obtaining data comprising a captured facial performance of a subject with a plurality of facial markers;
determining a three-dimensional (3D) bundle corresponding to each of the plurality of facial markers of the captured facial performance;
using at least the determined 3D bundles to retrieve, from a facial dataset comprising a plurality of facial shapes of the subject, a local geometric shape corresponding to each of the plurality of the facial markers; and
merging the retrieved local geometric shapes to create a facial reconstruction of the subject for the captured facial performance;
wherein retrieving the local geometric shape corresponding to each of the plurality of the facial markers, comprises:
evaluating a surface position of each of the 3D bundles on each of the plurality of shapes in the facial dataset to derive a point cloud corresponding to each of the 3D bundles;
creating a tetrahedral mesh from each of the point clouds; and
using each of the created tetrahedral meshes to retrieve, from the facial dataset, the local geometric shape corresponding to each of the facial markers.

13. The non-transitory computer-readable medium of claim 12, wherein the created tetrahedral mesh is a non-manifold tetrahedral mesh.

14. The non-transitory computer-readable medium of claim 12, wherein creating the tetrahedral mesh from each of the point clouds, comprises: tetrahedralizing each of the point clouds with a plurality of combinations of four points resulting in a non-manifold tetrahedralized volume.

15. The non-transitory computer-readable medium of claim 14, wherein tetrahedralizing each of the point clouds comprises: for at least one of the point clouds, removing points from the point cloud corresponding to expressions not associated with the point cloud, removing tetrahedra, or some combination thereof.

16. The non-transitory computer-readable medium of claim 12, wherein creating the tetrahedral mesh from each of the point clouds, comprises: for at least one of the point clouds:
 assigning a higher priority to tetrahedra that share more points with a tetrahedron used in a previous video frame for the 3D bundle associated with the at least one point cloud; or
 selecting a tetrahedron based on a determination that the selected tetrahedron's local surface geometry minimizes distances from neighboring 3D bundles.

17. The non-transitory computer-readable medium of claim 12, wherein merging the retrieved local geometric shapes to create the facial reconstruction of the subject, comprises:
 joining together the retrieved local geometric shapes to create a unified reconstruction of the subject's face; and
 blending together the joined shapes of the unified reconstruction.

18. The non-transitory computer-readable medium of claim 17, wherein blending together the joined shapes, comprises interpolating the joined shapes, and wherein joining together the retrieved local geometric shapes, comprises:
 constructing a Voronoi diagram from a neutral mesh of the subject's face, the Voronoi diagram comprising a plurality of Voronoi cells; and
applying each of the retrieved local geometric shapes to a corresponding one of the cells.

\* \* \* \* \*